(12) United States Patent
Nieuwoudt et al.

(10) Patent No.: US 11,541,328 B2
(45) Date of Patent: Jan. 3, 2023

(54) CONTACT TRAY HAVING BAFFLE WALL FOR CONCENTRATING LOW LIQUID FLOW AND METHOD INVOLVING SAME

(71) Applicant: KOCH-GLITSCH, LP, Wichita, KS (US)

(72) Inventors: Izak Nieuwoudt, Wichita, KS (US); Charles Griesel, Wichita, KS (US)

(73) Assignee: KOCH-GLITSCH, LP, Wichita, KS (US)

( * ) Notice: Subject to any disclaimer, the term of this patent is extended or adjusted under 35 U.S.C. 154(b) by 118 days.

(21) Appl. No.: 16/474,774

(22) PCT Filed: Jan. 10, 2018

(86) PCT No.: PCT/IB2018/050136
§ 371 (c)(1),
(2) Date: Jun. 28, 2019

(87) PCT Pub. No.: WO2018/130941
PCT Pub. Date: Jul. 19, 2018

(65) Prior Publication Data
US 2019/0321748 A1    Oct. 24, 2019

Related U.S. Application Data

(60) Provisional application No. 62/444,991, filed on Jan. 11, 2017.

(51) Int. Cl.
*B01D 3/16* (2006.01)
*B01D 3/32* (2006.01)
*F28C 1/00* (2006.01)

(52) U.S. Cl.
CPC ............. *B01D 3/324* (2013.01); *B01D 3/163* (2013.01); *F28C 1/00* (2013.01)

(58) Field of Classification Search
CPC ........ B01D 3/163; B01D 3/324; B01D 53/18; B01D 53/185; B01F 3/04113; B01F 3/04439; F28C 1/00
(Continued)

(56) References Cited

U.S. PATENT DOCUMENTS

| 243,297 A | * | 6/1881 | Perin | B01D 3/20 |
| | | | | 261/114.1 |
| 1,738,870 A | * | 12/1929 | Cox | B01D 3/22 |
| | | | | 261/113 |

(Continued)

FOREIGN PATENT DOCUMENTS

| CN | 2179778 Y | 10/1994 |
| DE | 86168 C | 4/1896 |

(Continued)

OTHER PUBLICATIONS

Office Action received for CN Application No. 201880005714.8, dated Nov. 12, 2020, 17 Pages (9 pages of English Translation and 8 Pages of Original Office Action).

(Continued)

*Primary Examiner* — Charles S Bushey

(57) ABSTRACT

A contact tray for use in a mass transfer or heat exchange column and having multiple baffles walls that cause the liquid flowing on an upper surface of a tray deck tray to change its direction of flow and narrow its flow path width and extend the length of the flow path when the liquid flows from an inlet area to an outlet on the tray deck. By narrowing the flow path, the volumetric flow rate of the liquid at any portion of the deck increases and reduces the opportunity for vapor entrainment of the liquid at low liquid flow rates. A downcomer extends downwardly from the outlet to receive liquid when it enters the outlet and then convey it downwardly to a discharge outlet located at a lower end of the downcomer. The downcomer includes an inclined or hori- (Continued)

zontal portion that causes the discharge outlet to be positioned beneath and in vertical alignment with the inlet area on the tray deck.

15 Claims, 7 Drawing Sheets

(58) Field of Classification Search
USPC .............................................. 261/110, 114.5
See application file for complete search history.

(56) References Cited

U.S. PATENT DOCUMENTS

| | | | |
|---|---|---|---|
| 1,811,247 A | | 6/1931 | Smith |
| 2,608,397 A | * | 8/1952 | Treub ...................... B01D 3/26 |
| | | | 261/109 |
| 2,752,229 A | | 6/1956 | Brown et al. |
| 3,062,517 A | * | 11/1962 | Voetter .................... B01D 3/22 |
| | | | 261/114.3 |
| 3,172,922 A | * | 3/1965 | Kehse ...................... C11B 3/14 |
| | | | 261/20 |
| 3,434,701 A | | 3/1969 | Bauer |
| 3,509,203 A | * | 4/1970 | Michaelis et al. ...... C07C 69/44 |
| | | | 560/92 |
| 4,032,410 A | * | 6/1977 | Kuxdorf .................. B01D 3/20 |
| | | | 202/158 |
| 4,483,747 A | | 11/1984 | Aruga et al. |
| 5,352,276 A | * | 10/1994 | Rentschler et al. ........................ |
| | | | B01D 19/0005 |
| | | | 261/114.1 |
| 5,518,668 A | * | 5/1996 | Chresand ................ B01D 3/22 |
| | | | 261/113 |
| 5,804,039 A | | 9/1998 | Kurazono et al. |
| 5,948,211 A | | 9/1999 | Yeoman et al. |
| 6,332,958 B1 | * | 12/2001 | Matsuda ................. C08F 6/003 |
| | | | 159/16.3 |
| 6,375,793 B1 | | 4/2002 | Uchida et al. |
| 6,575,438 B2 | | 1/2003 | Nutter et al. |
| 6,830,607 B2 | | 12/2004 | Allen et al. |
| 7,276,215 B2 | * | 10/2007 | Muller .................... B01D 3/18 |
| | | | 261/110 |
| 8,177,986 B2 | * | 5/2012 | Gullov-Rasmussen ...................... |
| | | | B01D 3/34 |
| | | | 210/767 |
| 2011/0240458 A1 | * | 10/2011 | Cartage .................. B01D 3/326 |
| | | | 203/49 |
| 2013/0113128 A1 | | 5/2013 | Alzner et al. |
| 2014/0284824 A1 | | 9/2014 | Bechtel et al. |

FOREIGN PATENT DOCUMENTS

| | | |
|---|---|---|
| DE | 86168 A1 | 12/1971 |
| DE | 102005044224 A1 | 3/2007 |
| JP | 381872 B | 1/1963 |
| JP | 2002045602 A | 2/2002 |
| RU | 2484876 C1 | 6/2013 |
| RU | 2502548 C2 | 12/2013 |
| WO | 2018/130941 A1 | 7/2018 |

OTHER PUBLICATIONS

Office Action received for KR Application No. 2019-7023071 dated Nov. 19, 2020, 19 Pages (10 Pages of English Translation and 9 Pages of Original Office Action).
Patil et al., "Operational and economic assessment of distillation column from the performance of tray", International Conference on Global Trends in Engineering, Technology and Management, pp. 500-505, 2016.
International Search Report and Written Opinion received for PCT application No. PCT/IB2018/050136, dated Mar. 20, 2018, 12 pages.
International Preliminary Report on Patentability received for PCT Application No. PCT/IB2018/050136, dated Jul. 25, 2019, 10 pages.
A.V. Kirillov, "Calculation of Contact Devices for Tray Columns", FSBEI HPE "KnAGSTU", 2014, pp. 72.
RU Office action dated Feb. 18, 2020, for application No. 2019122404/05, 14 pages.
Office Action received for JP Application No. 2019-537355, dated Sep. 21, 2021, 08 Pages (04 Pages of English Translation and 04 Pages of Official notification).

* cited by examiner

CONTACT TRAY HAVING BAFFLE WALL FOR CONCENTRATING LOW LIQUID FLOW AND METHOD INVOLVING SAME

CROSS-REFERENCE TO RELATED APPLICATIONS

This is a National Phase Application pursuant to 35 U.S.C. § 371 of International Application No. PCT/IB2018/050136, filed Jan. 10, 2018, which claims priority to U.S. Provisional Application No. 62/444,991, filed Jan. 11, 2017, each of which is hereby incorporated by reference in its entirety.

BACKGROUND OF THE INVENTION

The present invention relates generally to columns in which mass transfer and heat exchange occur and, more particularly, to contact trays for use in such columns to facilitate interaction between fluid streams flowing within the columns and to a method of using the contract trays for mass transfer and/or heat exchange.

Mass transfer columns are configured to contact at least two incoming fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along multiple trays or other mass transfer surfaces disposed within the column.

Various types of trays are commonly used in mass transfer columns to promote the desired contact and mass transfer between ascending and downwardly flowing fluid streams. Each tray normally extends horizontally across substantially the entire horizontal cross section of the column and is supported around its perimeter by a support ring welded to the inner surface of the circular column wall or shell. A number of trays are positioned in this manner with a uniform vertical spacing between adjacent trays. The trays may be located in only a portion of the column to perform one part of a multi-step process occurring with the column. Alternatively, the trays may be positioned along substantially the entire vertical height of the column.

Trays of the type described above contain one or more downcomers that are positioned at outlet openings in the tray deck to provide passageways for liquid to descend from one tray to an adjacent lower tray. Prior to entering the downcomer, the liquid on the tray deck interacts with ascending vapor that passes through apertures provided in selected portions of the tray deck and then flows over an outlet weir into the outlet opening on the tray deck. Those areas of the tray deck containing vapor apertures are commonly referred to as "active" areas because of the vapor and liquid mixing and frothing that occurs above those areas of the tray.

Under low liquid flow rates, such as rates less than 25 U.S. gallons per minute per foot of the width of the liquid flow path (25 gpm/ft of flow path width), a significant portion of the liquid flowing across the active area of the tray may become entrained as droplets in the ascending vapor and be carried with the vapor to the overlying tray. The smaller entrained droplets may be carried with the vapor through the vapor apertures in the overlying tray deck, while the larger droplets may impact against and form a film on the undersurface of the overlying tray deck. Portions of the film may then be carried by the vapor through the vapor apertures in the overlying tray. As this entrained liquid is carried by the vapor through the vapor apertures, it restricts the cross-sectional area available for vapor flow and increases the pressure drop across the tray. The entrained liquid also bypasses the desired interaction with vapor on the lower tray and leads to reduced operating efficiencies.

A need has thus developed for an improved tray that reduces the entrainment of liquid in the ascending vapor during low liquid flow rates.

SUMMARY OF THE INVENTION

In one aspect, the present invention is directed to a tray for use in a mass transfer column to facilitate interaction between fluids when they are flowing within the mass transfer column. The tray comprises a tray deck having an upper surface; an inlet area on the tray deck for receiving a downward flow of liquid onto the upper surface of the tray deck, a plurality of apertures distributed across an area of the tray deck and extending through the tray deck to permit upward passage of fluid through the tray deck for interaction with the liquid after it leaves the inlet area and flows across and above the area of the tray deck on which the apertures are distributed, an outlet positioned remotely from the inlet area on the tray deck for allowing removal of liquid from the upper surface of the tray deck after it has flowed from the inlet area and interacted with the fluid passing upwardly through the apertures in the area of the tray deck, a plurality of baffle walls extending upwardly from the upper surface of the tray deck and positioned to narrow a width of a flow path of the liquid when it flows from the inlet area to the outlet and to force the liquid to change its direction of flow at least twice and thereby lengthen the flow path, and a downcomer extending downwardly from the outlet to receive liquid when it enters the outlet and then convey it downwardly to a discharge outlet located at a lower end of the downcomer. The downcomer includes an inclined or horizontal portion that causes the discharge outlet to be positioned beneath and in vertical alignment with the inlet area on the tray deck.

In another aspect, the present invention is directed to a mass transfer column comprising a shell, an open internal region within the shell, and a plurality of trays described above positioned in vertically spaced-apart relationship within and extending across a cross section of the open internal region of the column.

In a further aspect, the present invention is directed to a method of interacting fluids on and above an upper surface of tray decks of trays positioned in vertically spaced-apart relationship within a mass transfer column and extending across a cross section of an open internal region formed by a shell of the mass transfer column. The method comprising the steps of delivering a liquid onto the inlet area of a tray deck on each of the trays and allowing it to flow along and above the upper surface of the tray deck along a serpentine flow path that is defined in part by a plurality of baffle walls that extend upwardly from an upper surface of each of the tray decks, with the liquid flowing at a rate of less than 25 gpm/ft of flow path width along and above the upper surface of the tray deck along the serpentine flow path, causing a vapor to ascend through a plurality of apertures in the tray deck to interact with the liquid as it flows along its serpentine flow path, removing the liquid from the tray deck at the end of its serpentine flow path by directing it through an outlet in the tray deck and into a downcomer, and then discharging the liquid from the downcomer onto the inlet area of an adjacent underlying one of the trays.

BRIEF DESCRIPTION OF THE DRAWINGS

In the accompanying drawings that form part of the specification and in which like reference numerals are used to indicate like components in the various views.

DETAILED DESCRIPTION

Figure 1:
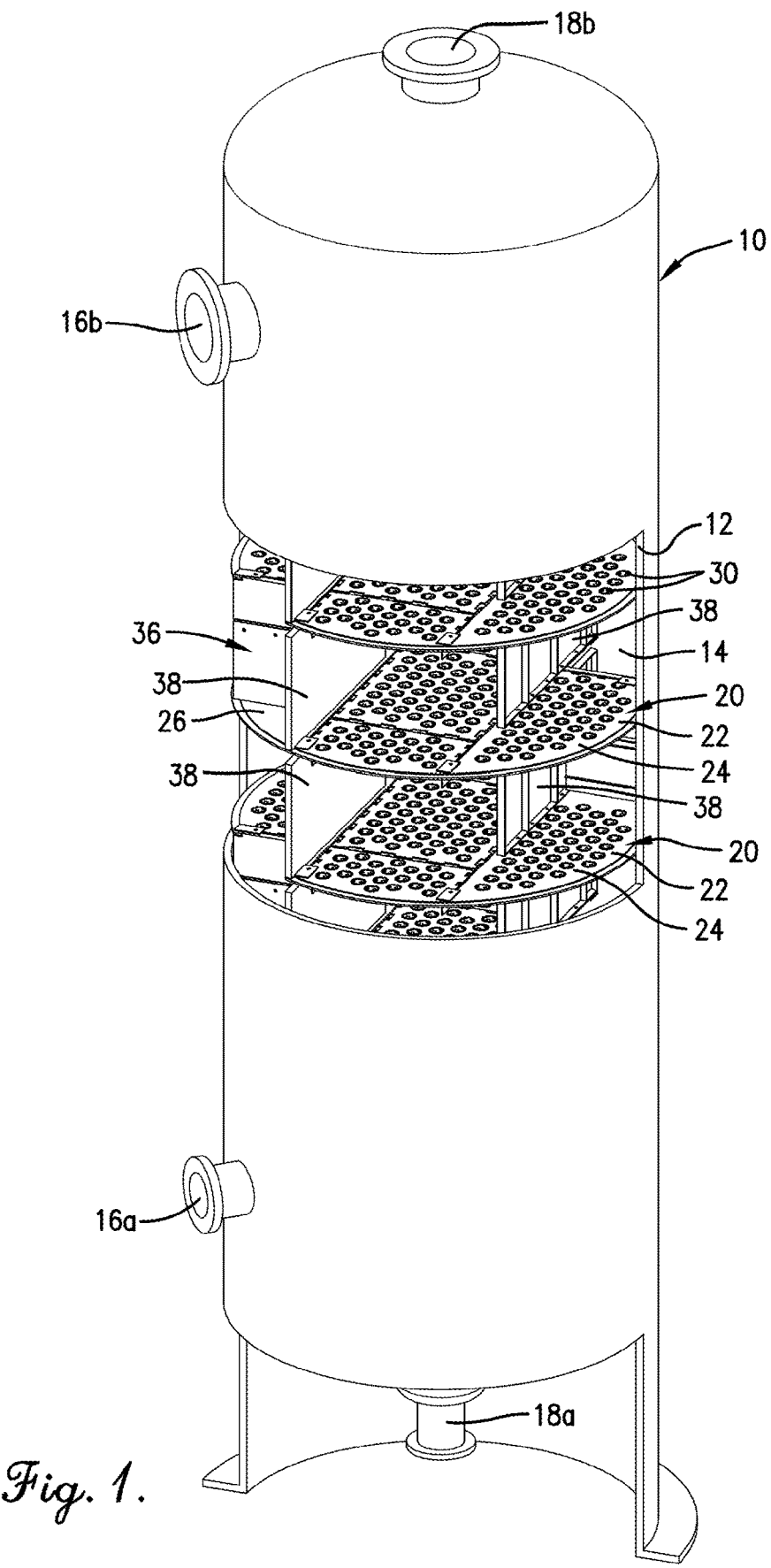
FIG. 1 is a fragmentary, perspective view of a column in which mass transfer and/or heat exchange are intended to occur and in which a portion of a shell of the column is broken away to show one embodiment of trays of the present invention.

Turning now to the drawings in greater detail and initially to FIG. 1, a mass transfer column suitable for use in mass transfer or heat exchange processes is represented generally by the numeral 10. The column 10 includes an upright, external shell 12 that may be generally cylindrical in configuration, although other configurations, including polygonal, are possible and are within the scope of the present invention. The shell 12 may be of any suitable diameter and height and may be constructed from one or more rigid materials that are desirably inert to, or are otherwise compatible with, the fluids and conditions present during operation of the column 10.

The column 10 is of a type used for processing fluid streams, typically liquid or vapor streams, to obtain fractionation products or to otherwise cause mass transfer or heat exchange between the fluid streams. For example, the column 10 may be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, or other processes occur.

The shell 12 of the column 10 defines an open internal region 14 in which the desired mass transfer or heat exchange between the fluid streams occurs. In one implementation, the fluid streams may comprise one or more ascending vapor streams and one or more descending liquid streams. In other implementations, the fluid streams may comprise substantially any combination of ascending or descending liquid streams or ascending or descending vapor streams.

One or more fluid streams may be directed into the column 10 through any number of feed lines 16, such as lower feed lines 16a or upper feed lines 16b, positioned at appropriate locations along the height of the column 10. In one implementation, vapor streams may be generated within the column 10 rather than being introduced into the column 10 through the feed lines 16a, 16b. One or more fluid streams may be directed out of the column 10 through any number of takeoff lines 18, such as lower takeoff line 18a and upper takeoff line 18b. In one implementation, liquid may be introduced through upper feed line 16b, descend through the column 10, and be removed through lower takeoff line 18a, while vapor may be introduced through lower feed line 16a, ascend through the column 10, and be removed through upper takeoff line 18b.

Other column components that would typically be present, such as reflux stream lines, reboilers, condensers, vapor horns, liquid distributors, and the like, are not illustrated in the figures because they are conventional in nature and an illustration of these components is not believed to be necessary for an understanding of the present invention.

Figure 2:
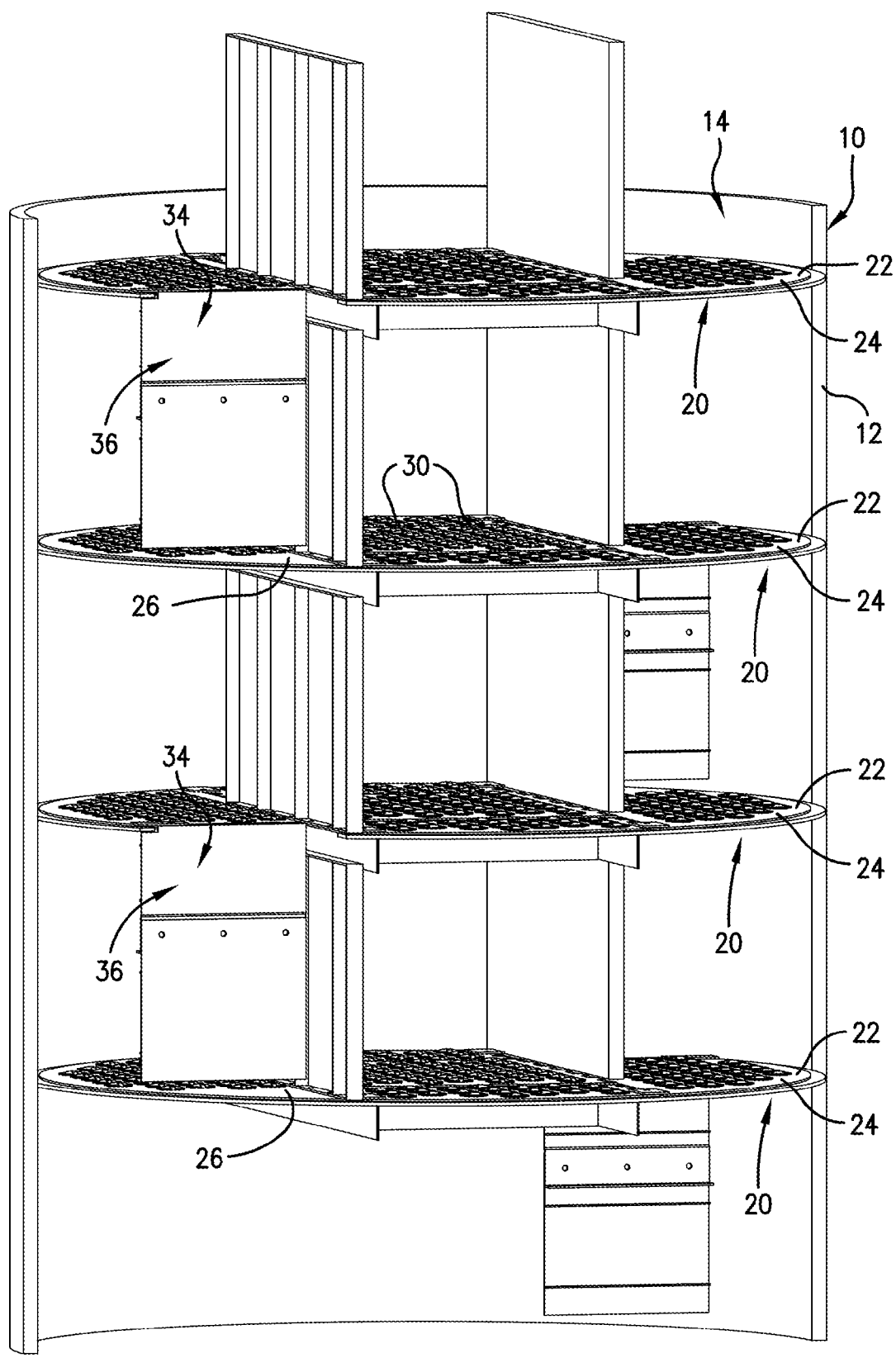
FIG. 2 is an enlarged fragmentary view of a portion of the column shown in FIG. 1 and taken from a left end perspective.
Figure 3:
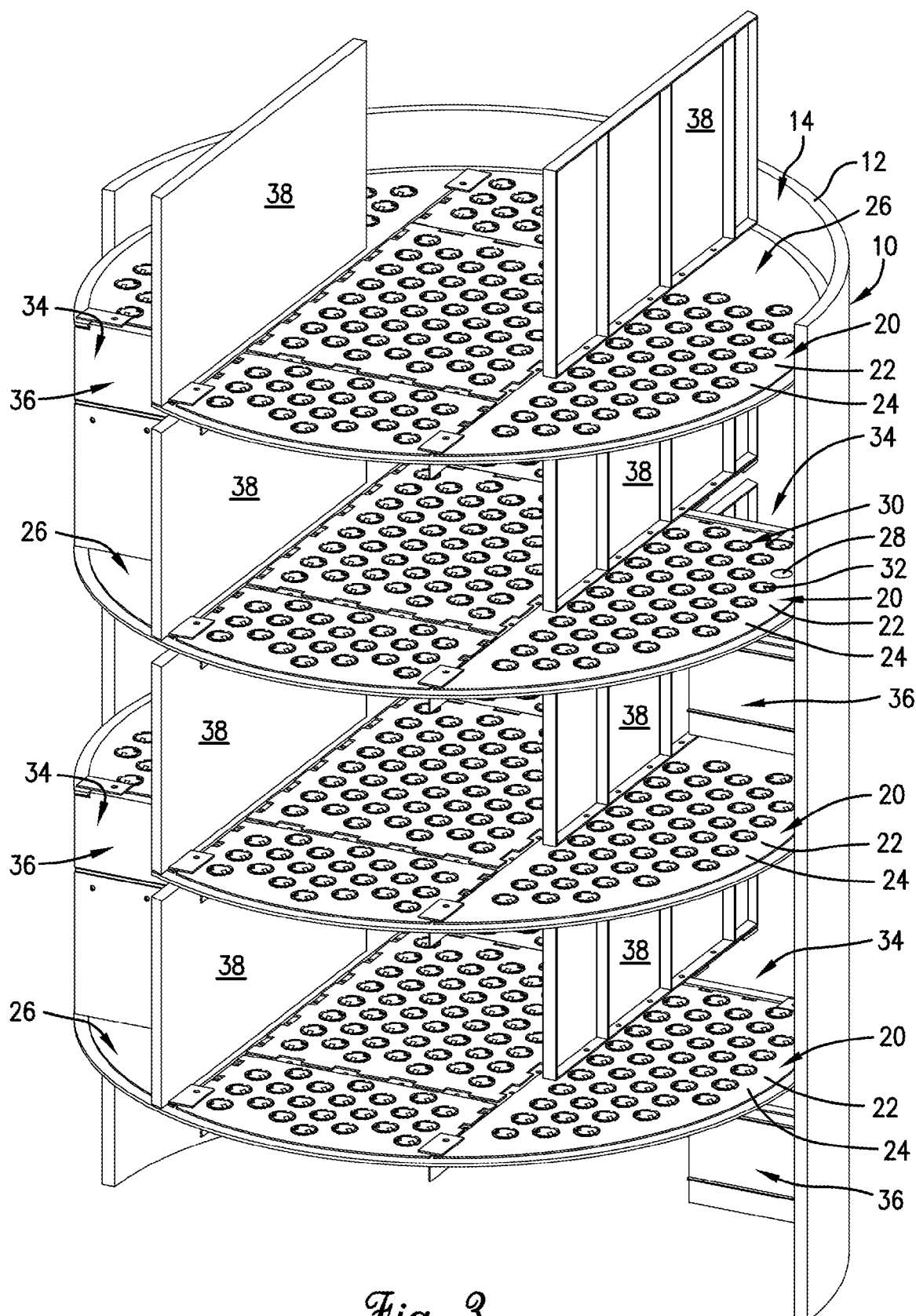
FIG. 3 is an enlarged fragmentary view similar to FIG. 2, but taken from a right end perspective.
Figure 4:
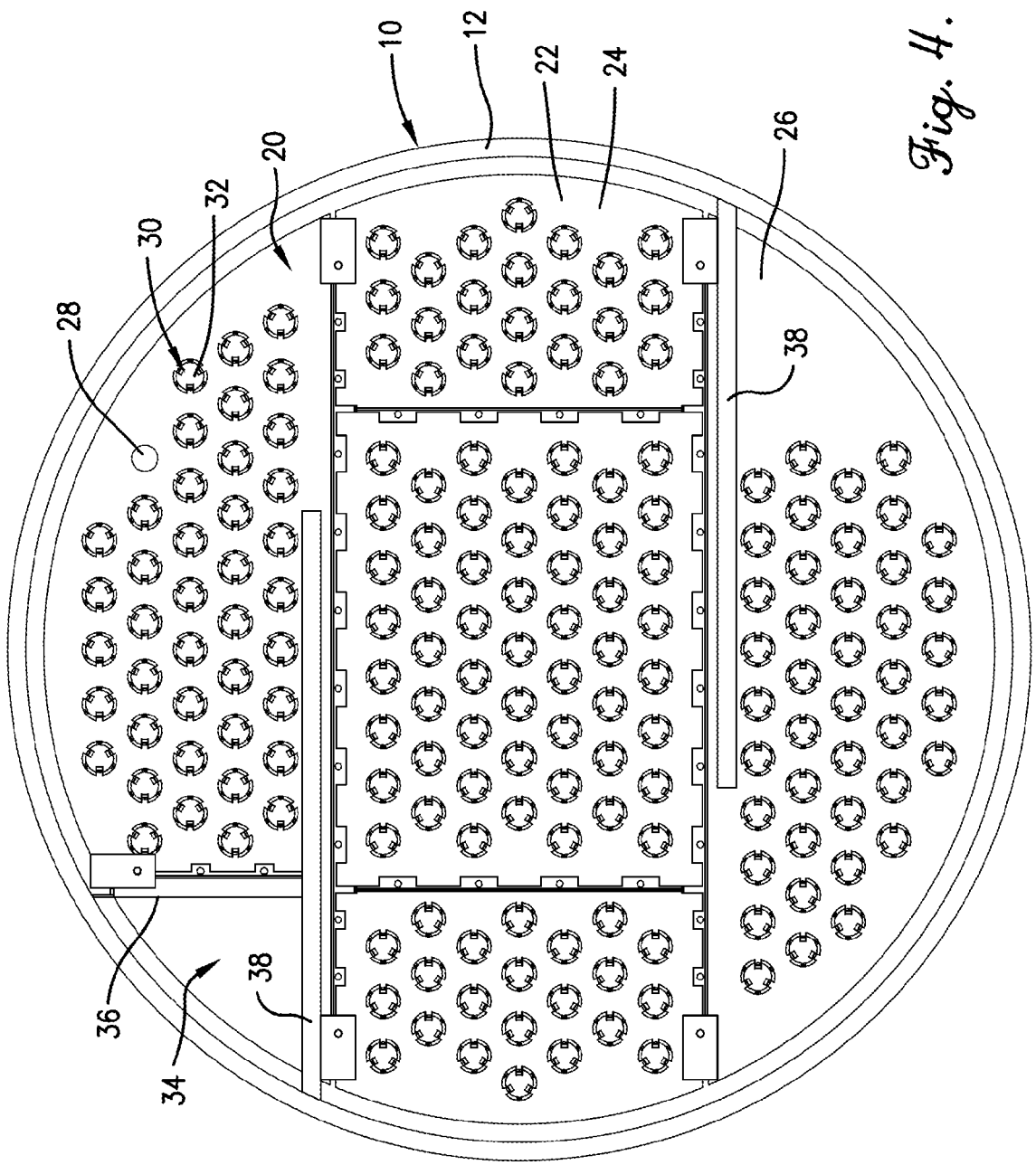
FIG. 4 is a top plan view of the column showing one of the trays shown in FIGS. 1-3.

Turning additionally to FIGS. 2-4, a plurality of contact trays 20 are positioned in vertically spaced-apart relationship within the open internal region 14 of the column 10 to facilitate interaction of the fluids flowing within the open internal region 14. The trays 20 are generally of the same or similar construction and extend generally horizontally across the entire cross-section of the column 10. Adjacent trays 20 in the illustrated embodiment are rotated 180 degrees with respect to each other about a center, vertical axis.

Each tray 20 has a generally planar tray deck 22 with an upper surface 24 along which fluids flow, as described in more detail below. The tray deck 22 is normally formed from interconnected tray panels that are each sized to fit through a manway (not shown) in the shell 12. An inlet area 26 is positioned on the tray deck for receiving a downward flow of liquid onto the upper surface 24 of the tray deck 22, such as from an overlying tray 20 or from a liquid distributor (not shown). A plurality of apertures 28 are distributed across an area, known as the active area, of the tray deck 22. The apertures 28 extend completely through the tray deck 22 to permit fluid to pass upwardly through the tray deck 22 for interaction with the liquid after it leaves the inlet area 26 and flows across and above the active area of the tray deck 22 on which the apertures 28 are distributed. The apertures 28 may be simple sieve holes, or they may form part of a fixed or moveable valve. In the illustrated embodiment, and as can best be seen in FIG. 4, the apertures 28 form part of a valve 30 having a valve cover 32 that is able to float up and down in response to the force exerted by the upward flow of fluid, such as a vapor, through the apertures 28. One of the valve covers 32 is removed in FIG. 4 to shown the apertures 28 that are associated with the valves 30. In another embodiment, the valve cover may be fixed to the tray deck so that it is unable to float up and down.

Each tray 20 further includes an outlet 34 positioned in the tray deck 22 remotely from the inlet area 26 for allowing removal of liquid from the upper surface 24 of the tray deck 22 after it has flowed from the inlet area 26 and interacted with the fluid passing upwardly through the apertures 28 in the active area of the tray deck 22. The interaction between vapor ascending through the apertures 28 or valves 30 and liquid flowing along the upper surface 24 of the tray deck 22 normally produces a froth or spray above the tray deck 22. Each tray 20 also includes a downcomer 36 that extends downwardly from the outlet 34 to receive liquid when it enters the outlet 34. The downcomer 36 then conveys it downwardly for discharge onto the inlet area 26 of the adjacent underlying tray 20 or, in the case of the lowermost tray 20, to a liquid collector (not shown) or other internal device.

As can best be seen in FIG. 4, in one embodiment, the inlet area 26 and the outlet 34 are located diagonally opposite from each other at opposite ends of the tray deck 22. The inlet area 26 and the outlet 34 are each sized to accommodate the designed volumetric flow rate of liquid on the trays 20. In the illustrated embodiment, the inlet area 26 and the outlet 34 respectively occupy only a minor segment of a chordal area at the opposite ends of the tray deck 22. In other embodiments, the inlet area 26 and outlet 34 may each occupy a major segment, including all, of the chordal area at the opposite ends of the tray deck 22.

Each tray 20 includes a plurality of baffle walls 38 that extend upwardly from the upper surface 24 of the tray deck 22 and are positioned to reduce a width of the flow path of the liquid when it flows on and above the tray deck 22 from the inlet area 26 to the outlet 34 and to force the liquid to change its direction of flow at least twice, such as by twice reversing its direction of flow, and thereby lengthen its flow path. By structuring the flow path in this manner, the baffle walls 38 concentrate the liquid flow and increase the volumetric flow rate of liquid and liquid head that is present on and above any portion of the active area of the tray deck 22. This increase in the volumetric flow rate of the liquid reduces the opportunity for the liquid to become entrained in the vapor ascending through the apertures 28 in the tray deck 22 and increases the efficiency of the tray 20 under low liquid flux or flow conditions, particularly liquid flow rates below 25 gpm/ft of flow path width or below 10 gpm/ft of flow path width.

In one embodiment, as shown in FIGS. 1-4, a first one and a second one of the baffle walls 38 are used and are positioned in spaced-apart relationship. In the illustrated embodiment, the first and second baffle walls 38 are positioned in parallel relationship to each other and divide the tray deck 22 into three segments of generally equal area. One end of the first baffle wall 38 abuts against one side of the shell 12 and the opposite end of the first baffle wall 38 is spaced a preselected distance from an opposite side of the shell 12. The preselected distance is normally selected so that the width of the flow path on the tray deck 22 as the liquid rounds the end of the first baffle wall 38 is roughly the same as the width of the flow path on either side of the first baffle wall 38. The second baffle wall 38 is positioned oppositely to the first baffle wall 38. That is, one end of the second baffle wall 38 is spaced the preselected distance from the side of the shell 12 at which the first baffle wall 38 is abutted and the opposite end of the second baffle wall 38 abuts the opposite side of the shell 12 from which the first baffle wall 38 is spaced the preselected distance. By placing the baffle walls 38 in this manner, a serpentine flow path is created for the liquid as it flows on the tray deck 22 from the inlet area 26 to the outlet 34. In situations where the baffle walls 38 are installed in a revamp of existing trays 20 that have side chordal downcomers, wall segments (not shown) or a partial chordal plate (not shown) may be used to block entry of the liquid into the downcomer except at the desired end of the liquid flow path.

The baffle walls 38 each have a height that is sufficient to guide most of the liquid froth and spray that is flowing on and above the tray deck 22 along one side each one of the baffle walls 38 and, when it reaches the end of the baffle wall 38, cause the liquid, including any froth and spray, to reverse direction and flow along an opposite side of the baffle wall 38. As an example, the height of the baffle walls 38 may be at least 50% of the vertical spacing between the upper surface 24 of the tray deck 22 on which it is positioned and the undersurface of the adjacent overlying tray deck 22. As another example, the height of the baffle wall 38 is at least 75% of such vertical spacing between the tray decks 22. As a further example, the height of the baffle walls 38 is 100% of the vertical spacing such that the baffle walls 38 extend upwardly to the undersurface of the adjacent overlying tray deck 22. In this example, the baffle walls 38 may be attached to the overlying tray deck 22 to maintain the desired spacing between the adjacent tray decks 22 and to provide a more rigid assembly of trays 20.

Figure 5:
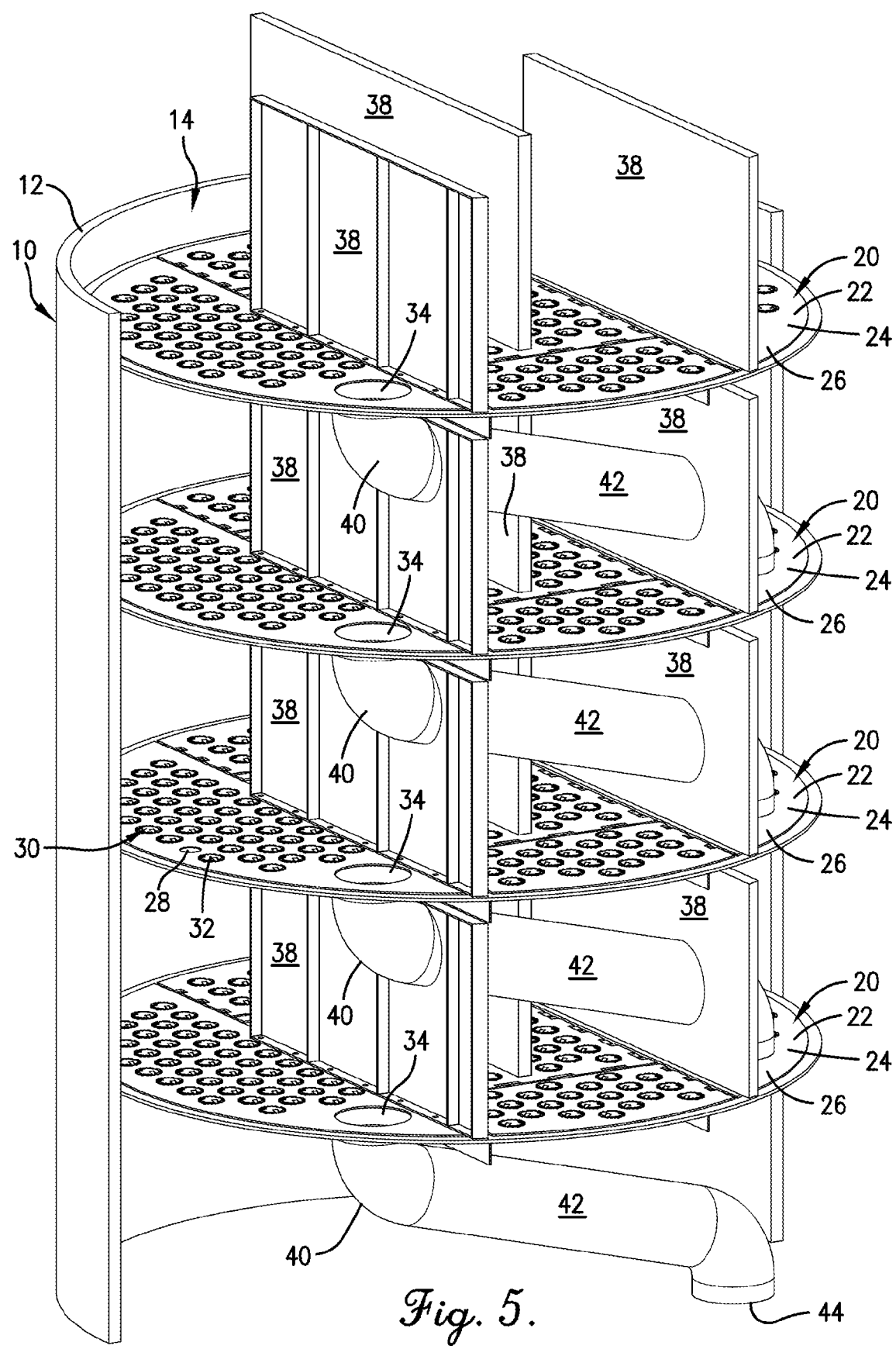
FIG. 5 is a fragmentary, perspective view of a column similar to FIG. 1, but showing a second embodiment of trays of the present invention.
Figure 6:
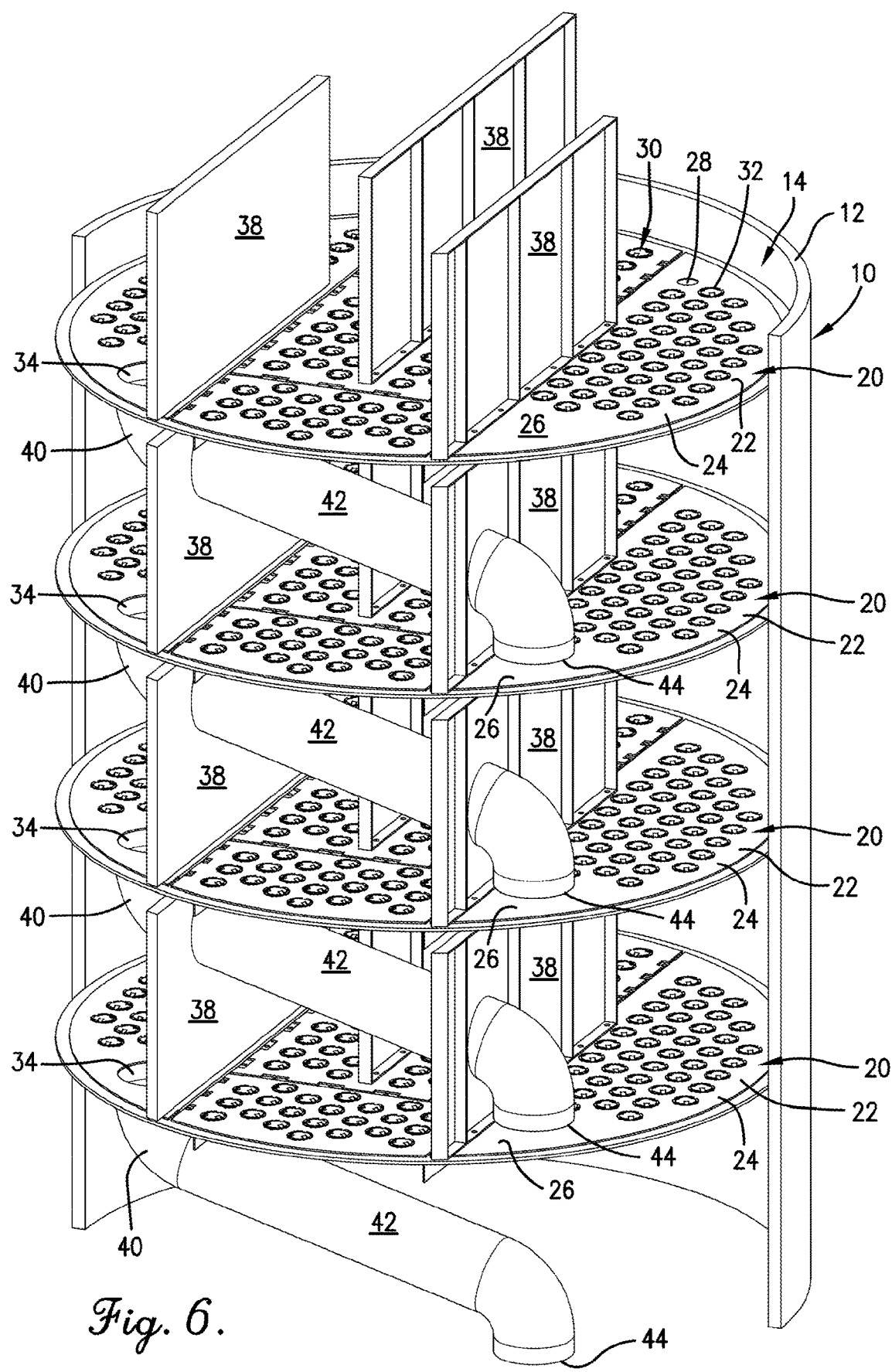
FIG. 6 is a view of the column shown in FIG. 5, but taken from a different perspective.
Figure 7:
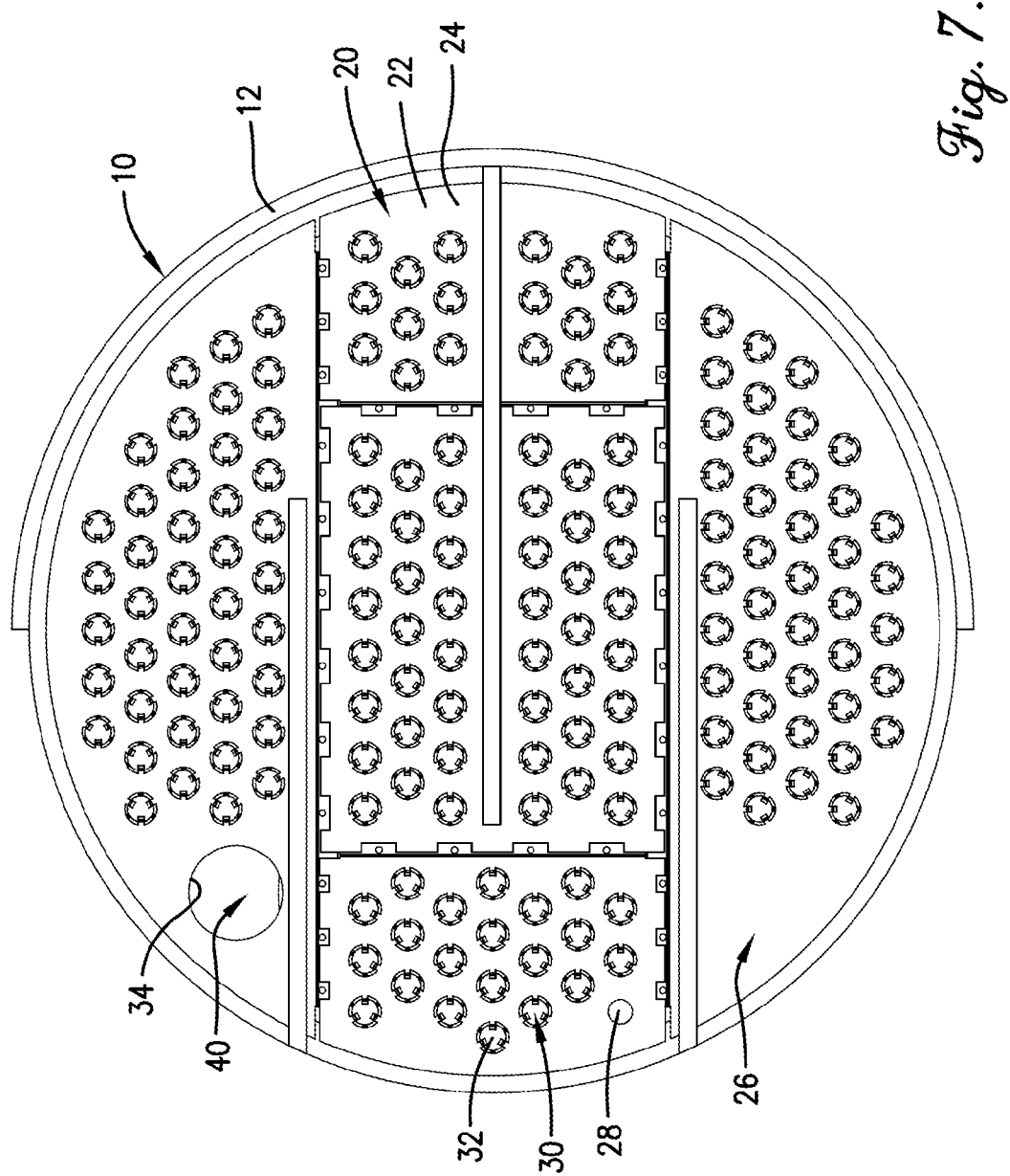
FIG. 7 is a top plan view of the column showing one of the trays shown in FIGS. 5 and 6.

It is to be understood that additional baffles walls 38 may be used to further lengthen the flow path of the liquid on the tray deck 22 and to reduce the width of the flow path. This narrowing of the flow path increases the volumetric flow rate of the liquid at any portion of the active area of the tray deck 22. For example, as shown in FIGS. 5-7, a third one of the baffle walls 38 may be positioned in spaced apart relationship to the first and second ones of the baffle walls 38 to cause the liquid to change its direction three times as it flows from the inlet area 26 to the outlet 34. Using a third baffle wall 38, and any odd number of baffle walls 38, is particularly advantageous in that it allows the inlet area 26 and the outlet 34 to be located at the same end of the tray deck 22, with the inlet areas 26 on the trays 20 being in vertical alignment and the outlets 34 also being in vertical alignment on the trays 20. When inlet areas 26 and the outlets 34 are vertically aligned in this manner, the serpentine flow of liquid may be in the same direction on each tray, rather than in opposite directions in the tray embodiment shown in FIGS. 1-4, thereby creating a corkscrew-type flow path as the liquid successively descends from one tray 20 to the next. Increased tray 20 efficiencies can be obtained as a result of this serpentine flow being in the same direction on each successive tray 20.

In order to deliver the liquid from the outlet 34 on one tray 20 to the inlet area 26 on the next lower tray 20, a downcomer 40, such as formed from pipe segments, extends downwardly from the outlet 34 and includes an inclined or horizontal portion 42 that causes a discharge outlet 44 of the downcomer 40 to be positioned in vertical alignment with the inlet area 26 on the tray deck 22 of the underlying tray 20. The downcomer 40 may need to extend through one or more of the baffle walls 38 on the underlying tray deck 22 to accomplish this common directional or corkscrew flow.

The present invention is also directed to a method of interacting fluids on and above the upper surface 24 of the tray deck 22 of the trays 20 when the trays 20 are positioned in vertically spaced-apart relationship within the mass transfer column 10 and extend across a cross section of the open internal region 14 formed by the shell 12 of the mass transfer column 10. The method includes the steps of delivering the liquid onto the inlet area 26 of each of the trays 20 and allowing it to flow along and above the upper surface 24 of the tray deck along a flow path that is oriented in one direction on one side of the first baffle wall 38 and is then oriented in another direction on an opposite side of the first baffle wall and then terminates at the outlet 34. Vapor is caused to ascend through the apertures 28, or valves 30 if present, in the tray deck 22 to interact with the liquid as it flows along its flow path. The liquid is removed from the tray deck 22 at the end of its flow path by directing it through the outlet 34 and into the downcomer 36 or 40. The liquid is then discharged from the downcomer 36 or 40 onto the inlet area 26 of the adjacent underlying one of the trays 20. In one embodiment, the quantity of liquid that is delivered onto the inlet area 26 of each of the trays 20 is such that it flows at a flow rate of less than 25 gpm/ft of flow path width along and above the upper surface 24 of the tray deck 22 along the liquid's flow path. In another embodiment, the liquid flow rate is less than 10 gpm/ft of flow path width.

The method also includes flowing the liquid around additional ones of the baffle walls 38 that extend upwardly from the upper surface 24 of the tray deck 22 and are positioned such that the liquid flow path is a serpentine flow path. In one embodiment, the liquid flows in opposite directions along the serpentine flow path on adjacent ones of the trays 20. In another embodiment, the liquid flows in the same direction along the serpentine flow path on the trays 20.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A mass transfer column comprising a cylindrical shell, an open internal region within said shell, and a plurality of trays positioned in vertically spaced-apart relationship within and extending across a cross section of the open internal region, each of said trays comprising:
    a tray deck having an upper surface;
    an inlet area on the tray deck for receiving a downward flow of liquid onto the upper surface of the tray deck;
    a plurality of apertures distributed across an area of the tray deck and extending through the tray deck to permit upward passage of fluid through the tray deck for interaction with the liquid after it leaves the inlet area and flows across and above the area of the tray deck on which the apertures are distributed and thereby creating a froth of the fluid and the liquid above the tray deck;
    an outlet positioned remotely from said inlet area on the tray deck for allowing removal of liquid from the upper surface of the tray deck after it has flowed from the inlet area and interacted with the fluid passing upwardly through the apertures in said area, said inlet area and said outlet being located at a same end of the tray deck;
    three or a greater odd number of parallel spaced apart baffle walls extending upwardly from the upper surface of the tray deck and positioned to narrow a width of a flow path of the liquid when it flows from the inlet area to the outlet and to force the liquid to reverse its direction of flow at least three times and thereby lengthen the flow path and cause it to be a serpentine flow path from the inlet area to the outlet; and
    a downcomer extending downwardly from the outlet to receive liquid when it enters the outlet and then convey it downwardly to a discharge outlet located at a lower end of the downcomer, wherein said downcomer includes an inclined or horizontal portion that causes the discharge outlet to be positioned beneath and in vertical alignment with the inlet area on the tray deck,
    wherein the inlet areas of the tray decks are in vertical alignment, the outlets on the tray decks are also in vertical alignment, and the serpentine flow path is in the same direction on each of the trays,
    wherein the three or a greater odd number of the spaced-apart baffle walls are positioned between the inlet area and the outlet on the tray deck and the spaced-apart baffles walls have a height that is at least 50% of the vertical spacing between the upper surface of the tray deck on which they are positioned and an undersurface of an adjacent overlying one of the tray decks to thereby guide the froth when flowing on and above the tray decks.

2. The mass transfer column of claim 1, wherein said plurality of spaced-apart baffle walls consists of three of said baffle walls.

3. The mass transfer column of claim 2, wherein each of said baffle walls has an end that abuts against one side of the shell and an opposite end that is spaced a preselected distance from an opposite side of the shell.

4. The mass transfer column of claim 2, including valves formed in part by said apertures.

5. The mass transfer column of claim 4, wherein said valves include a valve cover that is able to float up and down in response to a force exerted by an upward flow of fluid through the apertures.

6. The mass transfer column of claim 1, wherein said downcomer is formed by pipe segments.

7. The mass transfer column of claim 6, wherein the spaced-apart baffle walls extend upwardly to an undersurface of an adjacent one of the overlying tray decks.

8. A method of interacting fluids on and above the upper surface of the tray decks of a plurality of the trays of the mass transfer column of claim 1, the method comprising the steps of:
    delivering a liquid onto the inlet area of the tray deck on each of the trays and allowing it to flow along and above the upper surface of the tray deck along the serpentine flow path, said liquid flowing at a rate of less than 25 gpm/ft of flow path width along and above the upper surface of each of the tray decks along said serpentine flow path;
    causing a vapor to ascend through the plurality of apertures in each of the tray decks to interact with the liquid as it flows along its serpentine flow path;
    removing the liquid from each of the tray decks at the end of its serpentine flow path by directing it through the outlet in the tray deck and into the downcomer; and
    then discharging the liquid from the downcomer onto the inlet area of an adjacent underlying one of the trays.

9. The method of claim 8, wherein said liquid flows at a rate of less than 10 gpm/ft of flow path width along and above the upper surface of each of the tray decks along said flow path.

10. The method of claim 8, including flowing the liquid in a same direction along the serpentine flow path on adjacent ones of the trays.

11. The method of claim 8, including maintaining a spacing between adjacent ones of the tray decks by extending the baffle walls upwardly to an undersurface of an adjacent overlying tray deck and attaching the baffle walls to the adjacent overlying tray deck.

12. The method of claim 11, wherein said liquid flows at a rate of less than 10 gpm/ft of flow path width along and above the upper surface of each of the tray decks along said flow path.

13. The method of claim 8, wherein the spaced-apart baffle walls have a height that is at least 75% of the vertical spacing between the upper surface of the tray deck on which they are positioned and an undersurface of an adjacent overlying one of the tray decks.

14. The mass transfer column of claim 6, wherein the spaced-apart baffle walls have a height that is at least 75% of the vertical spacing between the upper surface of the tray deck on which they are positioned and an undersurface of an adjacent overlying one of the tray decks.

15. The mass transfer column of claim 6, wherein said downcomer extends through one or more of said plurality of spaced-apart baffle walls.

\* \* \* \* \*